United States Patent
Burton (10) Patent No.: US 8,508,059 B2
(45) Date of Patent: Aug. 13, 2013

(54) THRUST REACTION UTILIZATION METHOD AND SYSTEM

(76) Inventor: Von L. Burton, Huntsville, AL (US)

( * ) Notice: Subject to any disclaimer, the term of this patent is extended or adjusted under 35 U.S.C. 154(b) by 138 days.

(21) Appl. No.: 13/217,877

(22) Filed: Aug. 25, 2011

(65) Prior Publication Data
US 2013/0049375 A1   Feb. 28, 2013

(51) Int. Cl.
*F01D 1/18*   (2006.01)
(52) U.S. Cl.
USPC ............................................... 290/4 R
(58) Field of Classification Search
USPC ............................................ 290/4 A, 4 R, 52
See application file for complete search history.

(56) References Cited

U.S. PATENT DOCUMENTS

| | | | | |
|---|---|---|---|---|
| 2,487,614 A | * | 11/1949 | Strite | 60/630 |
| 3,921,827 A | * | 11/1975 | Joice | 414/793 |
| 4,253,380 A | * | 3/1981 | McConnell et al. | 91/503 |
| 4,302,683 A | * | 11/1981 | Burton | 290/4 R |
| 4,877,054 A | * | 10/1989 | Walter | 137/560 |
| 5,651,645 A | * | 7/1997 | Wawrzyniak et al. | 408/13 |
| 2005/0218752 A1 | * | 10/2005 | Bray et al. | 310/309 |

* cited by examiner

*Primary Examiner* — Tho D Ta
(74) *Attorney, Agent, or Firm* — Maier & Maier PLLC (57) ABSTRACT

A reaction engine driven electrical generating system comprising an electrical generator having an armature and a reaction engine driven to rotate the armature for generating electricity. The reaction engine drive includes a generally cylindrical housing with an internal truncated cone which internally divides the housing into two sections. A drive shaft extends generally horizontally into the housing and a reaction force rotation unit carrying a plurality of reaction engines is mounted upon the drive shaft. An enlarged air port is fashioned within one end of the housing and cooperates with an air inlet disc fixedly connected to the drive shaft. A plurality of air inlet apertures extend through the air inlet disc and air conduits connect the inlet apertures directly to corresponding intakes of said plurality of reaction engines. A monitor is operably connected to the armature or drive shaft and serves to provide a readout of speed of rotation of the drive shaft and generator armature. A fuel control is then modulated by the speed monitor to control the fuel flow to the reaction engines and maintain a generally constant armature speed over varying conditions of electrical load.

19 Claims, 6 Drawing Sheets

THRUST REACTION UTILIZATION METHOD AND SYSTEM

BACKGROUND

The generation of electricity is based upon principles espoused and experiments performed by Michael Faraday (1791-1867) which can be stated as follows; an electromotive force (EMF) is induced in a conductor (copper for example) whenever it cuts through magnetic lines of force. In this regard large electrical generators having field windings which surround a rotor or armature having windings. Rotation of the armature within the field produces an electric current. All substantial forms of alternating current of the type used in homes and businesses are generated by application of this principle.

There are three primary systems in existence today that are used for rotating armatures and commercially generating electricity. These primary systems comprise (1) water dams, and the utilization of (2) coal or oil and (3) nuclear fission to heat water that produces steam. Falling water or steam pressure causes a turbine to turn which in turn rotates an armature.

In a basic hydroelectric system, energy from stored water which is confined in a larger reservoir is channeled through a control gate that adjusts the flow rate. The flowing water passes through blades and control vanes of a reaction type turbine, which turns a shaft which in turn is connected to an armature inside a generator housing. Rotation of the armature then causes electrical energy to be generated.

In a fossil fuel system, the fossil fuel is burned and the heat from the combustion process is concentrated around a boiler where circulating water is converted to steam. The high pressure steam is used to rotate a turbine which is connected to a shaft. This shaft is connected directly to an electric generator and provides the necessary mechanical energy to rotate the armature (or field).

Nuclear fission power systems contain nuclear reactors which "burn" nuclear material whose atoms are split, causing the release of heat. The heat from the fission process is used to change circulating water into steam. The high pressure steam rotates a turbine that is connected to a shaft which is in turn connected to a rotor (field) inside a generator housing.

While such prior known systems are widely utilized, they exhibit various disadvantages such as remoteness from user locations and for inefficiency. Moreover, nuclear and fossil fuel systems tend to be environmentally unacceptable and even hazardous.

One theorist has suggested that a plurality of ram jet motors or rocket motors may be mounted around a vertically oriented shaft which in turn is connected to a rotor of an electrical generator. Provision is not made to adequately control such a system and it is doubted that the concept could adequately function in a commercial environment.

The difficulties suggested in the preceding are not intended to be exhaustive, but rather are among many which may tend to reduce the effectiveness of prior: electrical generation systems. Other noteworthy problems may also exist; however, those presented above should be sufficient to demonstrate that commercial generating systems appearing in the past will admit to worthwhile improvement.

SUMMARY

An exemplary embodiment described herein which is intended to accomplish at least some of the foregoing objects comprises an electrical generator including field windings and an armature which is operably connected to a reaction engine generation system.

A generally cylindrical housing is disposed axially adjacent to the electrical generator. The housing is provided with first and second end plates to form an enclosure. A truncated cone is coaxially mounted within the housing to form an exhaust gas deflector plate and further divides the housing into an inner and outer chamber. A drive shaft extends axially through the housing and carries a reaction force rotation unit with radial support arms. A reaction engine is mounted at the extremity of each arm within the inner chamber.

An enlarged air port is axially fashioned through the second plate and peripherally receives an air inlet disc mounted upon the drive shaft. A plurality of air apertures are cut through the inlet disc. A conduit extends between each air aperture and a respective intake port of a reaction engine to provide a direct air inlet passage for each engine.

The first end plate is arcuately bowed outwardly and forms with the inner chamber an exhaust collection chamber or manifold which may be vented to the atmosphere through a catalytic converter to scrub the exhaust.

A monitor is operably connected to the armature or drive shaft to detect the rotational speed of the generator armature. A fuel control system such as a flow control valve, fuel pump, or the like leading to the reaction engines is then regulated in response to monitored shaft speed to maintain the operating speed of the armature notwithstanding variations in load on the system.

Using the above outlined system, speeds as slow as 5 rotations per minute (rpm) can be accommodated using an appropriate gear wheel configuration at the point where the drive shaft interfaces with the generator housing. The drive shaft, reaction force rotation unit and reaction engines are disposed in a housing having a slanted deflector plate in the path of exhaust gases and an angular chamber communicating with the exhaust manifold. Means are provided for circulation of coolant water around the periphery of the deflection plate, with heated water being removed and applied to other purposes such as heating of buildings.

The reaction engines which rotate the shaft are preferably turbojet engines which will burn alcohol, hydrogen or synthetic fuels. A suitable condenser may be incorporated into the system, where appropriate, that will convert steam, if it is the output from the system back into water.

By embodying the features of the subject reaction engine system, the system efficiency is greatly enhanced. One hundred percent efficiency of a jet engine would require total energy loss from the combustion of fuel from the engine's exhaust. Friction from within the engine will cause a negligible loss; about 5%. The accepted efficiency of quoted figures of a liquid jet engine is about 50%. This means that 50% of the energy from the fuel is converted directly into thrust and 50% in the form of wasted heat (energy) is expelled from the tail of the engine's exhaust. This remaining 50% is normally lost since thrust is the only usable parameter from a conventional engine system which is used to propel an aircraft. The subject system traps most of this lost energy in the water jacket thus improving overall efficiency from (without heat energy in water jacket entrapment) 50% when it is compared with a configuration that embodies a reaction engine to approximately 90% allowing for an additional fraction loss from the system itself.

A conventional jet engine would provide the energy requirements of 6,079 homes or about 25,000 people. Engines of the type which are used on a supersonic transport would provide the needs of 24,327 homes of 100,000 people.

For smaller requirements, a conventional Boeing 707 engine would provide the needs of 2,838 homes or 12,000 people. This system can, of course, be constructed in tandem order for added power requirements.

Consider a Boeing 747 jet that cruises at 60,000 (4 jet engines at 15,000 hp each), one horsepower equals 745.7 kilowatts; yielding 44,742 kilowatts in equivalent energy. If there are 8,760 hours in a single year, 8,760 hours times 44,747 yields the equivalent of $3.91939 \times 10^9$ kilowatt hours per year. It is estimated that the average home in the United States uses the equivalent of about 58,000 kilowatts hours of total energy per year. Thus $3.91939 \times 10^9$ divided by 58,000 kilowatt hours yields about 6,757 homes, 6,757 multiplied times 90% efficiency yields 6,079 homes. Similar calculations can be performed for the other engines indicated above.

Actually these numbers do not represent the full capability of the system. Since 60,000 horsepower represents the thrust work obtained from the engine, the 90% was actually 90% of that parameter; that is, the 60,000 horsepower does not contain the wasted heat from the engine, only the thrust. Depending on the system, more homes could be supported by either converting this lost potential energy into electrical energy, useful heat energy or for other uses that would benefit from the availability of hot water or steam.

In addition to this feature of versatility and engine efficiency, it is also insignificant what fuel is used provided that it is not petroleum based. There are basically three fuels of primary appeal. They are alcohol, hydrogen and future synthetic fuels. This versatility is possible because energy is measured by its BTU content. Temperature measures the intensity of heat. The system could, of course, operate using petroleum based fuels.

In order to visualize this, it is advantageous to view fuel before it enters its combustion process. A pound of alcohol would have 12,700 BTUs while hydrogen would contain about 60,000; about 5 times as much energy. Synthetic fuel will contain in the neighborhood of 15,000 BTUs per pound. Considering that the subject system is an energy conversion system, it will convert any type of fuel that the engines are designed to accept. Consider, for example, alcohol. The subject system will supply the electrical needs of 24,000 people using the total volume equivalent of a typical interstate travel bus of alcohol per day. To layout this analysis it is necessary to some extent to be repetitive. Consider a 747 jet airplane and the energy required to keep it flying aloft. That amount of energy is 60,000 horsepower (only the energy in terms of thrust-work is contained in the 60,000 horsepower figure). Horsepower is conceptually the same as watts. Actually the person that discovered the watt determined the unit horsepower. That person was James Watt (1736-1819) and of course is credited with determining the units of both horsepower and watts. He determined that a horse pulling for one minute could lift some 32,400 pounds to a height of one foot. Later, to calculate the power of his engines, Watt rounded off this number and set the standard unit of 33,000 pounds raised one pound per minute. In today's scientific shorthand, this is expressed as 550 foot-pounds per second, which is the equivalent of saying 745.7 watts (550 foot-pounds per second times 1.356). Horsepower, therefore, is the same as "watts". Since there are 745.7 watts in one "horsepower", four 747 jet engines cruising at 60,000 horsepower is the same as saying that it is cruising at 44,742 kilowatts.

As indicated above, since there are 8,760 hours in a year, the energy required to keep a 747 jet flying 24 hours per day 365 days per year would be $3.91939 \times 10^9$ kilowatt hours. Since each home in the United States uses about 58,000 kilowatt hours per year, the energy required to keep the 747 aloft would supply the needs of 6,079 homes ($3.91939 \times 10^9$ divided by $58,000 \times 0.90$) assuming 90% efficiency.

It is all in the BTU content of the fuel used. The BTU content per pound of jet fuel is 18,500 and alcohol is 12,770. Thus there is a great deal of energy in a pound of alcohol, however less than that in a pound of jet fuel. From the above the average U.S. home uses about 58,000 kilowatt hours per year. A "kilowatt-hour" is conceptually the same as a "BTU." There are 3,413 BTUs in one kilowatt hour. Thus, each home would use about 545,325.7 BTUs per day ($158.9 \times 3,413$). Since one pound of alcohol contains 12,770 BTUs, each home would use about 42 pounds of alcohol per day (545,325.7 divided by 12,770) which is the equivalent of 5.3 gallons per day. Since there are 0.1337 cubic feet in one gallon 5.3 gallons is the equivalent of 0.70 cubic feet; not very much space. However, when it is considered that a 747 jet carries its fuel in its wings, the volume of the wings would be the required volume to keep the plane flying from five to six hours. Assuming the volume equivalent of the wings would support flight for four hours, six pairs of wings stacked would represent the total volume requirement to keep the plane flying 24 hours per day; not much volume. Actually, for alcohol, since its BTU content is 12,770 BTUs per pound, an additional pair of wings should be stacked since aviation fuel contains a BTU content of 18,500 BTUs per pound and alcohol 12,770 BTUs per pound. Even less hydrogen per pound would be required in that its BTU content is five times that of alcohol (60,000 BTUs per pound versus 12,700 BTUs per pound). Also, less synthetic fuel per pound would be required per output unit of work since its expected BTU content will be in the neighborhood of 15,000 BTUs.

A word concerning the utilization of synthetic fuel might be appropriate at this point. The use of synthetic fuel would be feasible but the major trade-off is not cost but the possible value of the system as it relates to improved efficiency as well as its minimal environmental impact when it is compared with converted coal power plants that liberate significant carbon dioxide by-products through their smoke stacks. The subject system lessens, or possibly to a large extent eliminates, this danger because more of the energy from the carbon based material (coal or a synthetic which is made from coal) is converted directly into energy.

High speeds for such a system would be undesirable due to the effect of centrifugal forces acting upon the engine mounting points. The subject system provides for a great deal of flexibility in this sense. More specifically, the gear wheel interface joining the rotor shaft with the generator is fitted with a suitable cogwheel configuration which provides for adjustments in the speed of the reaction engine in the chamber.

Another factor that dictates the speed at which the reaction engines must rotate is the number of magnetic poles contained on the rotor of the generator. This relationship is given by $$f = \frac{Pn}{120} \text{ cycles per second}$$

where P represents the number of poles on the generator and n the number of revolutions the generator must be rotated in one minute and f the frequency per second of the current emerging from the generator (cycles per second).

In the United States 60 cycles per second is the standard cycles per second.

Since $f = \dfrac{Pn}{120}$ $n = \dfrac{f \times 120}{P}$ $n = \dfrac{60 \times 120}{P}$ This puts the number of poles on the rotor in direct relation to the number of revolutions the rotor must make in one minute. For example, 200 revolutions could be provided by placing 36 poles on the rotor.

An optimum gear wheel configuration would be designed for each system that might have unique capabilities in terms of requirements from homes and businesses. A configuration of one 8-tooth wheel meshing with one 40-tooth wheel would provide the required rotation for the 36 poles for the example as provided above. The reaction engines would make 5 rotations per minute, the generator 60 rotations per minute and 60 cycle current would be generated.

For this same configuration the reaction engine's rotation rate of the shaft leading to the rotor or field would not exceed 200 rpm if the generator shaft was direct drive; thus eliminating the gear wheel configuration. From this perspective the torque arm distance from the generator extension shaft must be considered. For a 10 foot torque arm the reaction engine would travel at a rotation rate of 142.6 miles per hour (62.8× 200×0.01136). The numerical result of 62.8×200 yields the number of total feet (distance) a 10 foot arm would be required to travel in one minute. The conversion factor 0.01136 converts this numerical result into miles per hour.

If this torque arm is increased to heights of 20, 30 and 40 feet respectively, the resulting miles per hour would be 385, 427 and 569 miles per hour respectively. The engines would rotate the shaft at 200 rpm, but perform as if they were operating at 569 mph. A rotary arm 40 feet implies a diameter of about 80 feet—the equivalent height of roughly a 5 story building.

A turbo jet usually contains a multi-stage axial compressor (alternate sets of rotating and stationary blades) drawing in air and compressing it. Fuel (alcohol, hydrogen or future synthetic fuels) is injected into the combustion chamber and the subsequent rise in temperature produces a considerable increase in the volume of gases which are expelled through the exhaust nozzle at the rear of the engine. The performance of a turbo-jet can be improved by means of an after-burner, which is a second combustion chamber placed between the turbine and the propulsion nozzle. Additional fuel is injected into this chamber and combustion is effected with the oxygen unconsumed in the main combustion process.

Ram jets would be most undesirable and unattractive in that their design does not provide for adaption of a control system. It is a jet with no moving parts. The ram jet engine began to receive attention during the second half of the 1940's and reached its peak in the 1950's. These jets have been called flying stove pipes for the absence of rotating parts that characterize the turbo engine. The ram jet gets its name from the method of air compression. It cannot operate from standing but must be accelerated to a high speed by another means of drive. The air enters a spike-shaped inlet and diffuser which serves the same purpose as the compressor. In the ram jet, fuel is injected and burns with the aid of flame throwers that stabilize the flame. The burning fuel imparts thermal energy to the gas, and the expansion through the nozzle at speeds greater than the entering air produces the forward thrust. The ram jet, always needing an auxiliary propulsion system for starting, got squeezed between improved turbine engines and rockets around the 1950's and never recovered. The absence of desirable qualities of the ram jet caused its demise.

It is actually the rise of the incorporation of the turbine in the engine that eliminated one of the above negative characteristics of ram jets and caused its demise. This improvement led to the capability of moving to lower speeds while still maintaining operation. The lack of this design embodiment in the ram jet would make it undesirable for use with this system. The turbines control the intake and compression of air entering the system.

A high speed efficiency of the reaction engines obtained at 200 revolutions per minute may be achieved by an adjustment of the torque arm distance from the drive shaft. The rise in propulsion efficiency of the turbo jet has about a 45 degree slope and as defined here represents a straight line drawn in such a way that it coincides with the maximum portion of the actual curve. Five hundred sixty-nine (569) miles per hour for a 40 foot arm versus 142 miles per hour with a 10 foot arm would not significantly impact the overall efficiency of the subject system. It is relatively insensitive to engine efficiency. What is impacted is increased effect of wear on the engine and more frequent engine replacement. An engine operating at higher efficiencies would extend engine time but not affect the efficiency of the overall system to any significant extent. To accommodate various requirements, the volume of the exhaust deflector chamber can be increased. A cooling fin by-pass mechanism is also incorporated to accommodate various heat dissipation rates.

Integral to a utility power system is its control system. As amperage load is increased from the utilization of home appliances and industry requirements, the rotor inside the generator housing (or field surrounding the rotor) begins to resist rotation.

The subject system includes three types of control systems either of which may be used singularly and alternately: (1) a rotor rotation rate variation detector control system, (2) an eddy current inducement valve control system, and (3) a magnetic interaction control systems. Non-embodiment of a control system into the design of a power generating system of this type would result in a non-functioning system in the sense of accommodating various power load changes. In this regard, modern current control systems as known in the art may be substituted as desired.

The rotor rotation rate variation detector control system works on the principle of a sensor juxtapositioned to a rotating shaft carrying "n" circumferentially mounted magnets. As the magnets pass in front of the sensor, the rate of passage will be detected. The rate of change causes a flow valve or fuel pump to vary fuel flow to the engines to meet the varying load conditions.

The eddy current inducement valve actuator system utilizes the principle of eddy currents. An electric current induced within the body of a conductor when the conductor moves in a region where there is a change in magnetic flux will react with the field of the magnet to produce a force which turns the magnetic field and a valve or fuel pump control permitting the flow of sufficient fuel to the engines to allow for varying amperage load conditions. The faster the magnet rotates, the greater the movement of the fuel pump control. As the generator drive shaft tends to slow down in speed, the fuel valve or fuel pump control would be calibrated to open an amount to permit sufficient fuel to cause the engines to maintain a constant speed.

The magnetic interaction control systems utilize magnetic interaction to rotate a valve or fuel pump control and permit fuel flow to engines whose requirements would vary depending upon amperage load.

Considering the principle behind operation of this control system, a magnet or coil turns so that its magnetic moment vector "M" lines up with the magnetic intensity vector "B", that is, there must exist a torque acting to rotate (turn) "M" into "B" when the vectors are not aligned. This torque is proportional to the size of the angle between the two vectors.

Different magnets or coils at the same magnetic orientation in the same magnetic field will experience different torques. For a given orientation in a given magnetic field, the torque on a coil is proportional to the number "N" of turns and the area "A" of the circuit formed by each turn. Hence, a magnetic moment can be defined as below.

The magnetic moment of a coil is a vector whose magnitude is the product of the number of turns, the current in each turn and the area of the circuit, and whose direction is perpendicular to the plane of the coil in the sense given by the right-hand rule. Thus: Magnetic moment vector=number of turns (N)×current in each turn (I)×area formed by each turn (A)

$$M = NIA$$

Thus with this definition, the torque "L" is proportional to "M" and the sin □. The torque of course is different in different magnetic fields. It is convenient to define the magnetic field (B) in terms of its intensity so that the torque is also proportional to "B"; that is, to use torque on a coil of unit magnetic moment oriented at □=90° as a measure of magnetic density. Hence, the following equation for torque can be used as the defining equation for the magnitude "B".

$$L = MB \sin \square$$

Where the following units are derived:
L is in Newton meter (N·m)
M is in Area meter squared (A·m2)
B is in Webers per meter squared (Wb/m2).

The unit of magnetic intensity defined by this equation is given the name Weber per square meter. From equation (2) one Weber per square meter is the magnetic intensity that will result in a torque of 1 N·m on a coil of magnetic moment 1 A·m² placed with the axis perpendicular to the direction of the magnetic intensity.

All magnetic units can be expressed as or in terms of mechanical units and the unit of electrical charge or current. Thus from equation (2) it is noted that the unit of "B" can be written as $$\frac{Wb}{m^2} = \frac{1N}{A \cdot m} = 1 \frac{kg}{c \cdot s}$$

The coil may be wound on a circular frame or a rectangular frame or on a frame of any other shape. If the different turns on the coil have different areas, "A" is to be taken as the average area "A". Since the magnetic torque is proportional to the current in the coil, the spring torque is proportional to the current in the coil.

With these coil arrangements for the actuator, movement will correspond to a definite value of IV where
I=current in fixed coils
V=voltage in torque coil
From equation (2), as previously stated "L" is in units of Newton meter (N·m)

$$L = MB \sin \square$$
$$L = \frac{Wb}{m^2} = \frac{N}{A \cdot m}$$
$$L = \frac{N}{A \cdot m} = \frac{A \cdot m^2}{1} = N \cdot m \text{ magnetic torque}$$

Alcohol is one exemplary fuel source of fuel for use in the subject system. Alcohol has the advantages of the utilization of almost any organic plant material, one of which is corn. One bushel of corn yields the equivalent output of 18 pounds of fuel (alcohol). Other feed stocks could be used with similar alcohol yields.

Alcohol is significantly less a pollutant than the more carbon based fuels such as jet fuel, gasoline and of course coal. Alcohol does not by-product hydrocarbons that affect the ozone layer of the atmosphere, but has the advantage of a negligible by-product termed aldehydes. The de minimis impact on the atmosphere coupled with its replaceable production from a variety of organic plants makes alcohol an attractive fuel for the subject system.

Turbo jet engines can facilely be modified to accept alcohol as it is an adjustment of the fuel-air mixture ratio in the engine that would make such engines adaptable to this system.

Hydrogen is also an attractive fuel. At standard pressure (14.7 psi) the temperature of liquid hydrogen is −423° F.; it is the second coldest substance known.

The greatest attribute of hydrogen as a fuel, however, is that it can produce the highest exhaust velocity of any molecular substance (the higher the exhaust velocity, the greater the propulsive thrust that can be produced per unit mass of propellant). The reason hydrogen produces the highest exhaust velocity is due to the low molecular weight and high BTU content/pound. Its molecular weight, two, is the lowest of any substance in nature. This characteristic combined with its great abundance in the form of water makes hydrogen an attractive fuel for the subject system.

Engines adapted for the subject system operate on a basic turbo jet engine principle, however, in one embodiment a different type of heat exchanger normally associated with such engines will be used. In this regard, the heat exchanger of an engine for the subject system may use part of the hot water or a by-product of the engines heat to heat the hydrogen and convert it from −423° F. through 1300° F. and up to 2200° F. the combustion gas temperature. The heat exchangers would be either flat plate, shell and tube, cross flow or center flow types with the shell and tube appearing as the most attractive. Thrust would be limited only by the size of the engine but with current technology at about a 12,000 hp level. Hydrogen, of course, is non-polluting—its output being that of water.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Figure 1:
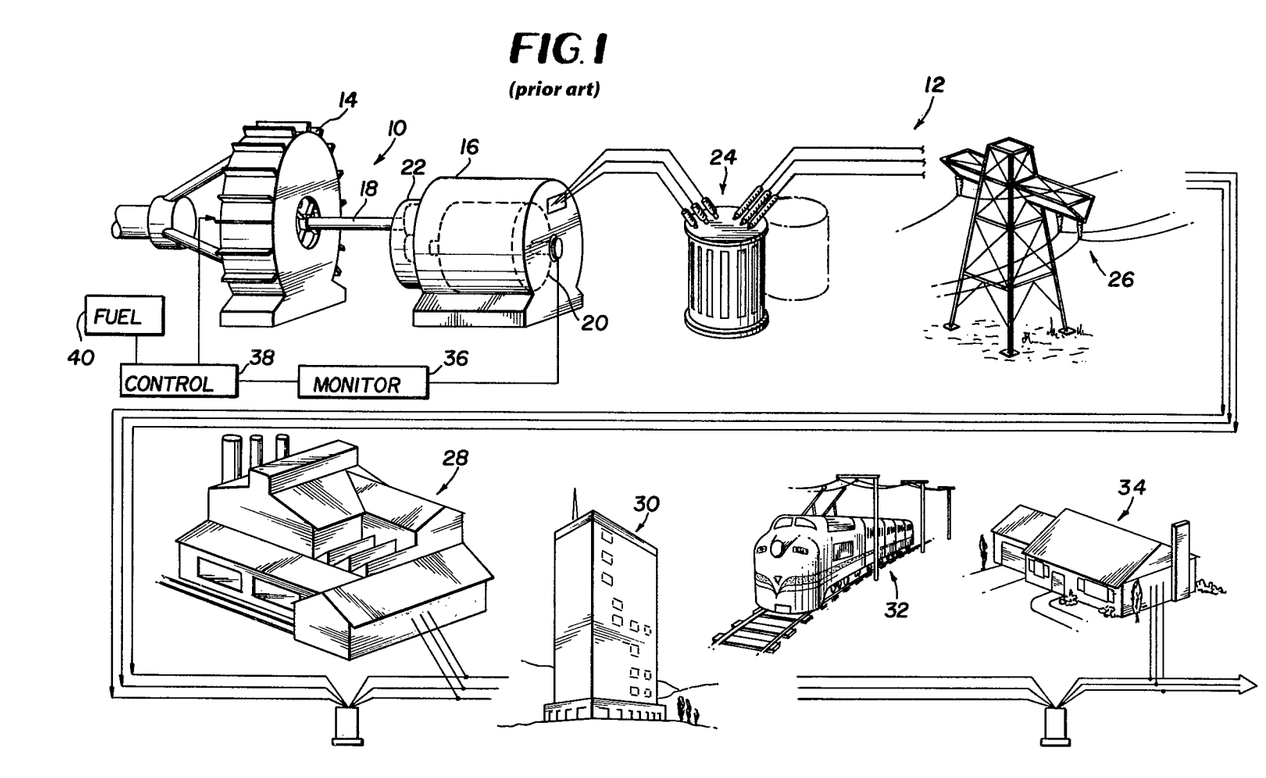
FIG. 1 is an axonometric schematic view of a reaction engine driven generating system in accordance with an exemplary embodiment in cooperation with an illustrative electrical distribution system.

Referring now to the drawings and particularly to FIG. 1 thereof, there will be seen a schematic representation of a reaction engine driven generating system 10 in accordance with an embodiment of the invention and a conventional electrical distribution system 12.

More specifically the reaction engine drive system includes a generally cylindrical housing 14 having a generally horizontal central longitudinal axis positioned adjacent an electrical generator unit 16. A drive shaft 18 extends axially within the housing and is driven by a plurality of reaction engines (not shown) within the housing.

The drive shaft 18 operably connects to the rotor or armature 20 of the adjacent generator either directly or through a spur gear train 22 as previously discussed.

A typical electrical distribution system 12 is shown connected to the subject electrical generating system and includes an initial transformer station 24 which converts 12,500 to 25,000 volts current to 138,000 to 765,000 volts for transmission over long lines 26 to a plurality of user stations such as an industrial user 28, a commercial user 30, a transportation user 32, a home user 34 and the like.

It will be appreciated that user demand varies over the course of a day such that at peak loads extra resistance will be placed on the generating equipment with a tendency to slow down the speed of rotation of the generator rotor. In order to provide a generally constant rotor speed under varying loads, the subject system detects drive shaft or armature rotation speed by a monitor 36. This information is input to a suitable controller 38, such as a flow valve or fuel pump, connected to a fuel system 40 leading to the reaction engines. Accordingly as armature speed tends to decrease with added loads, the fuel is increased to the reaction engines which maintain the desired drive shaft and rotor speed.

Figure 2:
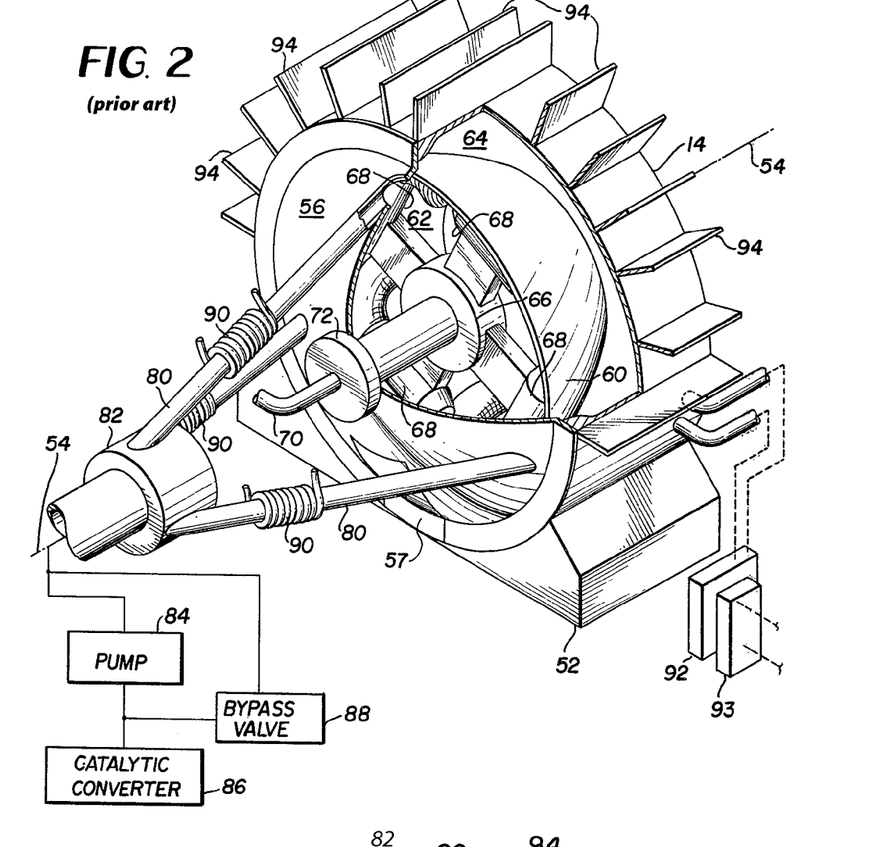
FIG. 2 is a detailed axonometric view of a reaction engine drive system wherein a portion of an exterior cylindrical housing has been broken away to disclose internal structure detail.
Figure 3:
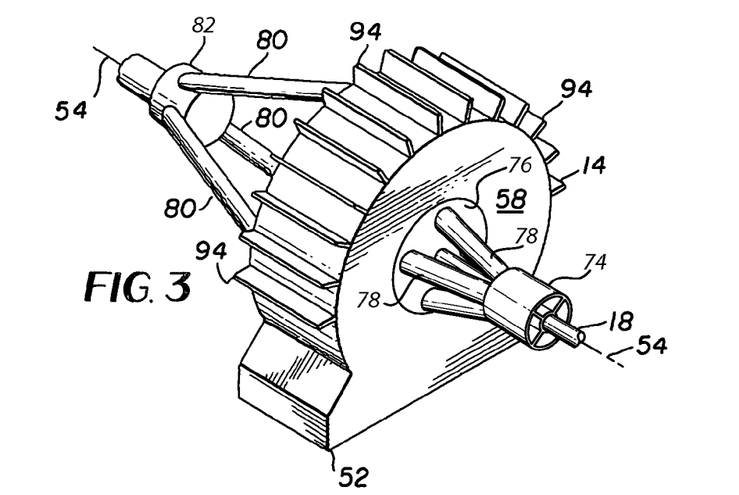
FIG. 3 is a reduced axonometric view of the subject reaction engine drive taken at an alternative perspective with respect to the view depicted in FIG. 2.

Turning now to FIGS. 2 and 3 there will be seen axonometric views of a reaction engine drive system in accordance with an embodiment of the invention. More specifically a generally cylindrical housing 14 is shown mounted upon a base assembly 52 such that a central longitudinal axis thereof 54 extends generally parallel with a ground surface.

The housing 14 is fitted with a first 56 and second 58 end plate to form an enclosure. A truncated cone, exhaust deflector 60, is mounted within the housing enclosure wherein a base portion of the cone abuts against the first end plate 56 and an upper portion of the truncated cone abuts against the second end plate 58. The cone may be preferably fashioned with outwardly arcuate side walls and forms in cooperation with the exterior housing and end plates, an inner 62 and outer 64 chamber within the housing. An entrance and exit door 57 to inner chamber 62 with first plate 56 and access to outer chamber 64 is provided at a suitable location. In some embodiments, exhaust deflector 60 may have a hemispheric or truncated hemispheric configuration.

A drive shaft 18 coaxially projects into and through the housing and carries a reaction force rotation unit 66 and reaction engines 68 as well as will be discussed more fully below. These engines are supplied fuel such as alcohol, hydrogen or synthetic compositions, as previously discussed through a supply conduit which is coaxially connected to internal passages within the drive shaft. A slip ring connection of conventional design 72 interfaces between the stationary supply line 70 and the rotating shaft 18.

Figure 7A:
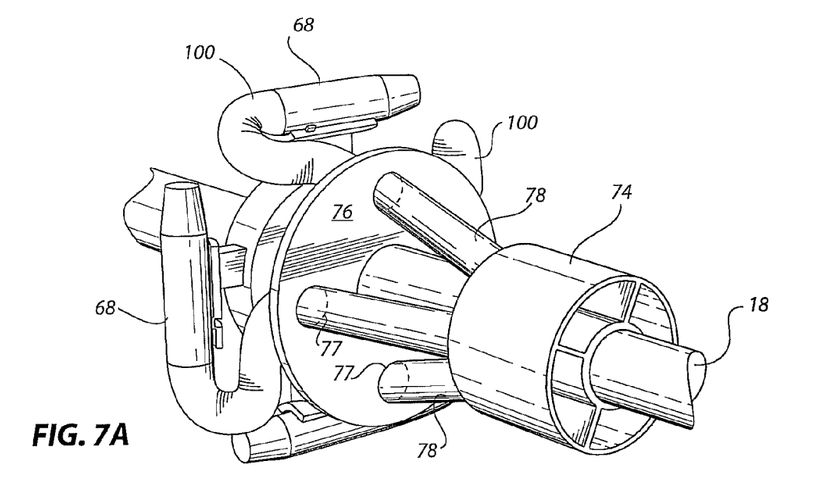
FIG. 7A, is an axonometric view of the air inlet manifold and reaction engines mounted upon the reaction force rotation unit and drive shaft in accordance with the embodiment.

Oxygen is supplied to the reaction engines 68 through an inlet manifold 74 disposed coaxially in relation to the second end plate and axially mounted upon drive shaft 18, such that inlet manifold 74 rotates with drive shaft 18 and reaction engines 68, note FIG. 3. The inlet manifold 74 is fashioned with a plurality of air inlet ducts 78 which correspond in number to the number of reaction engines such that air may be conveyed from the inlet manifold to the intake of the reaction engines. Air inlet ducts 78 extend from the inlet manifold 74 to an inlet disc 76, which is likewise axially mounted upon drive shaft 18 and rotates with drive shaft 18 and reaction engines 68. The inlet disc 76 is fashioned with a plurality of air inlet apertures 77 which are in communication with the air inlet ducts 78, note FIG. 7A.

Air thus flows into inlet manifold 74 and through inlet ducts 78 to supply the turbo jet engines 68. Supplied with fuel and oxygen the turbo jet engines 68 serve to rotate the reaction force rotation unit 66 and drive shaft 18 to power an electrical generator 16 as previously discussed. In an alternate embodiment, inlet manifold 74 can be sized to cover all air inlet apertures 77 within the manifold without the use of ducts between the manifold and the apertures. Furthermore, air may be provided thereto from an external source, for example a plurality of compressors that are compatible with the specific requirements of the engines.

As exhaust emits from the rotating turbo jet engines it is deflected against the deflection cone 60 and co-mingles within the inner chamber before being exhausted through a plurality of exhaust ducts 80 leading to an exhaust manifold 82. The release of exhaust from the inner chamber 62 lowers pressure inside inner chamber 62, allowing for the continued provision of air to jet engines 68 via inlet manifold 74 and inlet ducts 78.

Exhaust gases from the inner chamber 62 may be withdrawn by a pump 84 and fed through a catalytic converter 86 to the atmosphere. Alternatively, exhaust gases may bypass the pump. In one embodiment heat exchange coils 90 are wrapped around the exhaust conduits 80 to extract useful heat energy to gasify liquid hydrogen fuel, provide auxiliary building heat, or serve other useful purposes where heat energy may be desirable.

In addition to the heat exchange conduits 90, the outer chamber 64 is continuously filled at suitable inlet points with a heat exchange fluid, such as water, which is circulated around chamber 64 and fed to a plurality of fluid pumps 92 for transmission to places that would benefit from the energy contained in the heated fluid. In some situations it may be desirable to maintain a constant output fluid temperature and provide additional heat to fluid leaving the outer chamber 64. In such event, a plurality of thermostatically controlled auxiliary heaters 93 linked to desired output fluid temperature is positioned on a downstream side of the fluid pumps 92 to heat fluid in an outgoing fluid line as indicated in FIG. 2.

In situations where reaction engine drive system 10 is constructed proximate a body of water, the water may be circulated via a water inlet conduit and a water outlet conduit provided in communication with outer chamber 64. The circulation of water may be controlled by the provision of inlet and outlet valves on the respective water conduits. The circulation of water may be varied as necessary to maintain a desired temperature within inner chamber 62. The circulation of water may further be varied as necessary to obtain a desired temperature of the effluent water from outer chamber 64. The effluent water may be returned to the body of water, or a percentage of the effluent water can be diverted for other purposes, for example to extract heat energy therefrom, as described above. A percentage of the effluent water may also pass through an additional heating apparatus for the purposes of conversion to vapor, for example, for driving a conventional steam-based power generator.

Water used in connection with the reaction engine driven generating system 10 can further be recycled. For example, such water may be used to provide hydrogen fuel for the jet engines 68 of the generating system 10. Hydrogen may be obtained from the used water by any known method of hydrogen generation, including electrolysis, catalyst-based methods, organic-based methods, and so forth.

Still further the cylindrical housing 14 is operably fitted with a plurality of radially projecting, longitudinally extending heat exchange fins 94 to provide added cooling as desired.

Referring now to FIGS. 4-12 there will be seen various detailed views of structural aspects of the subject reaction engine drive system.

Figures 4, 5, 6, 10, 11:
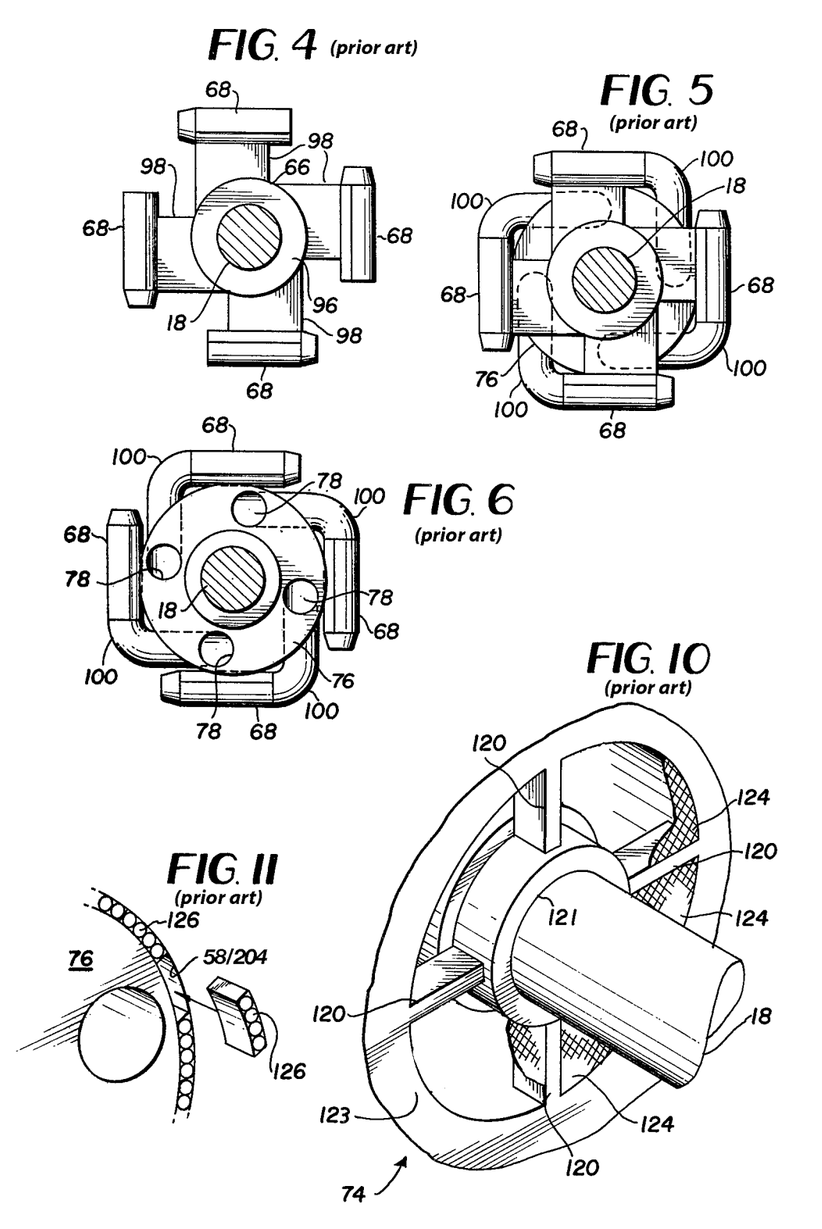
FIG. 4 is a detailed planned view of a central drive shaft, a reaction force rotation unit and a plurality of reaction engines mounted thereupon.
FIG. 5 is an elevational view similar to the view depicted in FIG. 4 wherein an air inlet disc is disclosed in cooperation with inlet conduits to deliver air directly to the plurality of reaction engines.
FIG. 6 is a front view of the air inlet disc as depicted in FIG. 5.
FIG. 10, note sheet 3, is a detailed view of an enlarged air inlet manifold including the provision of an inlet screen means to prevent foreign objects from being sucked into the reaction engines.
FIG. 11 is a detailed view disclosing a bearing system between the outer periphery of the air inlet disc and the inner periphery of the enlarged air inlet port fashioned through one end plate of the reaction engine housing, or through a half-shell enclosing the reaction force rotation unit.

FIG. 4 discloses more clearly the reaction force rotation unit 66 fixedly mounted upon the drive shaft 18. A reaction force rotation unit includes a cylindrical base 96 and a plurality of radiating structural arms 98. A reaction engine 68 is mounted at the end of each arm to turn the unit as previously noted. The arm offset integral to the unit would provide more base area to the unit's base.

FIGS. 5 and 6 illustrate an air inlet disc 76 fixedly mounted upon the drive shaft 18. The air inlet disc 76 has a plurality of air inlet apertures 77. Air conduits 100 extend from these inlet apertures directly to the inlet of a corresponding turbo jet engine.

Figure 7B:
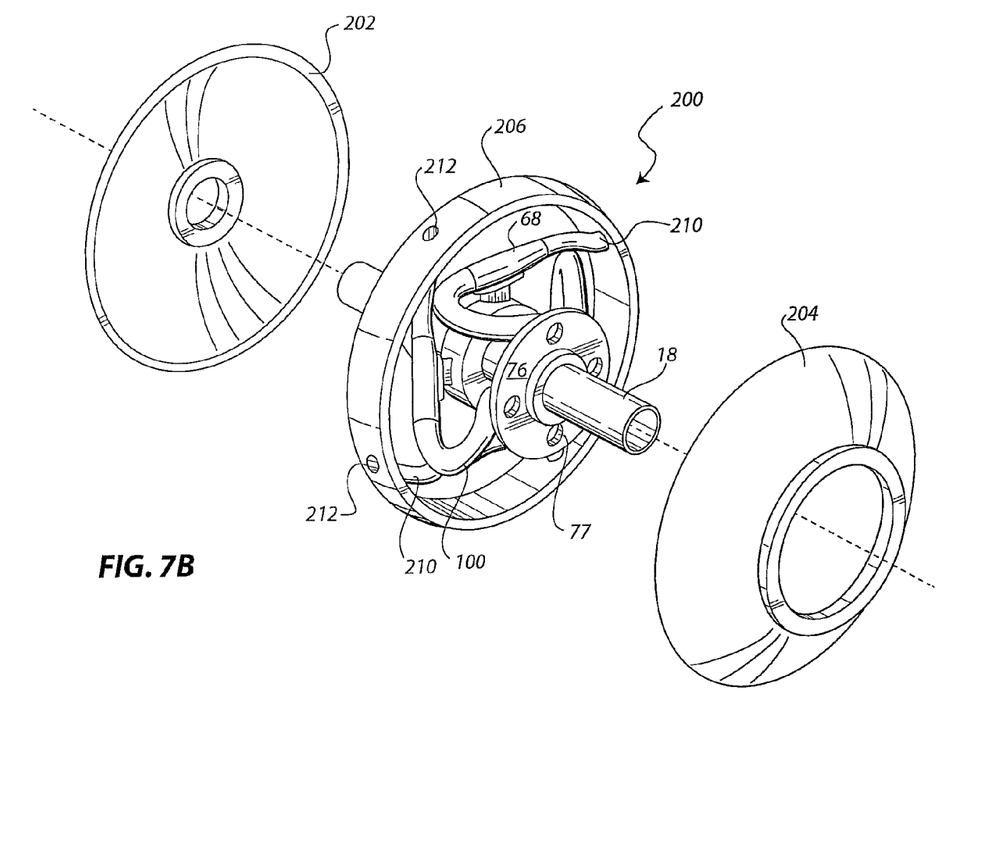
FIG. 7B is an exploded view of an exemplary embodiment of a reaction force rotation unit and a pair of half-shells enclosing the reaction force rotation unit.
Figure 7C:
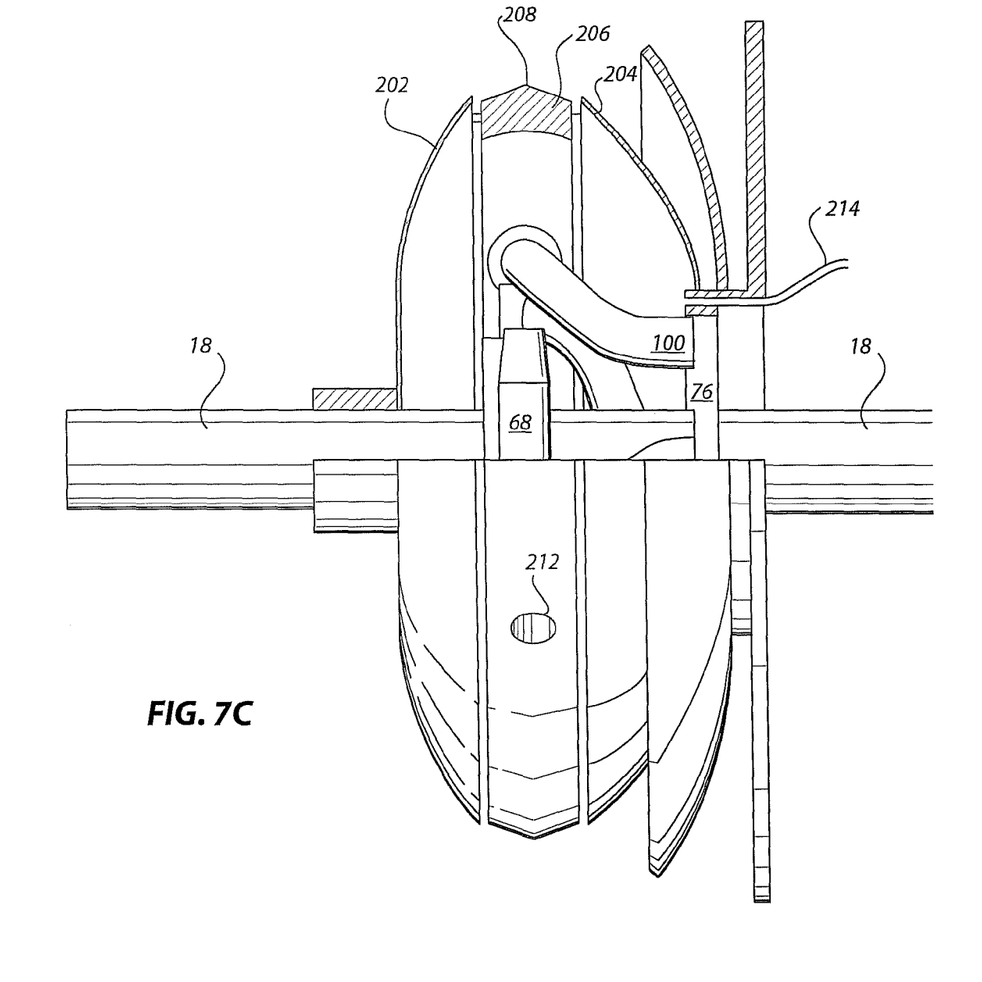
FIG. 7C is a partial cross sectional view of the exemplary embodiment of a reaction force rotation unit enclosed by a pair of half-shells.

FIGS. 7B-7C show another embodiment of a reaction force rotation unit 200 that may be used with an exemplary embodiment of generating system 10. The reaction force rotation unit 200 is enclosed by a pair of spherical frusta, first 202 and second 204 half-shells. An aperture is defined in first half-shell 202 and sized to receive drive shaft 18 therethrough, and an aperture is defined in second half-shell 204 and sized to receive inlet disc 76 therein, the inlet disc being rotationally supported therein by roller bearings 126, note FIG. 11.

The reaction force rotation unit can include four reaction engines 68 disposed substantially 90° apart from each other around reaction force rotation unit 200. Air conduits 100 extend from the air inlet disc 76 to the reaction engines 68, as discussed above. Extending from the exhaust ends of the reaction engines are exhaust conduits 210, which terminate in bores 212 defined through a peripheral ring 206. Peripheral ring 206 rotates with the reaction force rotation unit 200 and driveshaft 18 and can thus be, together with engines 68, the thrust-producing section of reaction force rotation unit 200. The peripheral ring can have a larger diameter at the midsection than at the edges, such that an aerodynamic cusp, or tip, 208 is defined at the midsection of peripheral ring 206. The diameter at the edges of peripheral ring 206 can be substantially similar to the diameter of the portions of first 202 and second 204 half-shells that are disposed adjoining peripheral ring 206.

As half shells 202, 204 are stationary, peripheral ring 206 can be rotatably supported between first 202 and second 204 half-shells by a bearing or a low-friction track guide. The track guide may be any low-friction track guide known in the art that enables system 10 to function as described herein. Non-limiting examples of such track guides include those used on known roller coaster systems, high-speed rail systems, magnetic-levitation train systems, and so forth.

Negative air pressure may be provided to the interior of reaction force rotation unit 200 via vacuum line 214. The volume enclosed by first 202 and second 204 half shells and peripheral ring 206 may thus have a vacuum therein, and, consequently, reaction engines 68 can rotate within the vacuum.

Figures 8, 9:
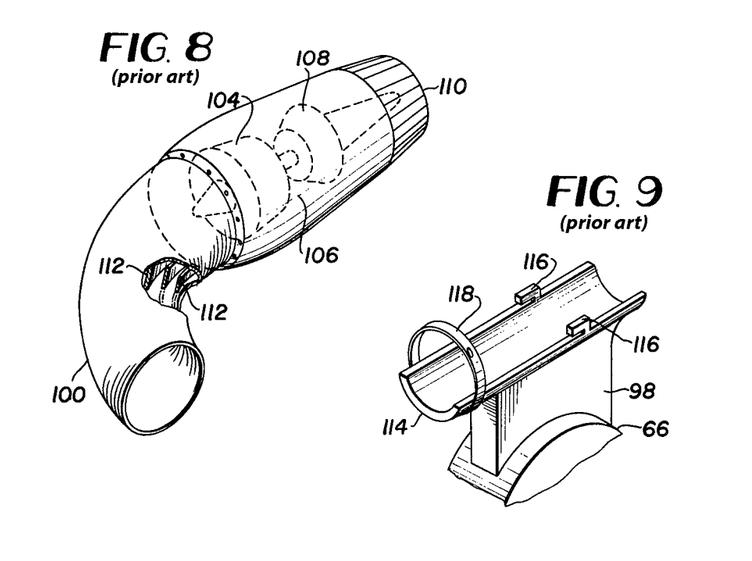
FIG. 8 is a schematic axonometric view of a single reaction engine and air inlet conduit including air flow normalizing vanes within the interior of the curved inlet conduit.
FIG. 9 is a detailed axonometric view of a reaction engine mounting assembly.

The engines 68 are preferably turbo jets, note FIG. 8, having a compression stage 104, a combustion stage 106 and a turbine stage 108 to drive the compressor. Power is provided by the thrust of the expanded gas as it leaves the engine exhaust 110.

The air conduit 100 bends from a longitudinal to a transverse posture from the air inlet disc to the reaction engine. Internal vanes 112 are mounted within the conduit 100 in order to facilitate a generally uniform flow stream around the curved portions of the conduit. Internal vanes 112 may be adjustable so as to direct air flow to compensate for drops in air pressure that can result from the curvature of the air conduits 100, thereby maintaining air flow to reaction engines 68. The adjustment of internal vanes 112 may be computer-controlled, and appropriate sensors may be provided as needed within air conduits 100 to enable the functionality described herein.

As shown in FIG. 9, the turbo jet may be releasably connected to the extremity of a support arm 98 by the provision of a mounting saddle 114 having thrust mounting blocks 116 and a plurality of circumferential mounting collars 118. However, any other suitable mounting arrangement that allows system 10 to function as described herein may be utilized. Additionally, sensors may be provided as necessary for computer-controlled adjustments to the components of system 10. As a non-limiting example, the length of support arms 98 may be adjusted to provide variations in torque generated by the movement of reaction engines 68, the angle of reaction engines 68 may be adjusted, and so forth. Such adjustments may be carried out to maximize efficiency, in response to conditions detected by the provided sensors, in response to external or environmental conditions, or as otherwise may be necessary. Support arms 98 may be constructed from steel, from high-strength lightweight metal alloys, from carbon fiber, or from any other known material that can provide a combination of light weight, high tensile strength, high temperature tolerance, low thermal expansion, and high rigidity characteristics.

While illustrated embodiments of reaction engine driven generating system 10 show four reaction engines 68 and four support arms 98, any desired number of engines and support arms may be utilized. The annular configuration of peripheral ring 210 may further be modified to be a hexagonal, octagonal, or any n-gonal structure, or may have any shape that is architecturally feasible and that enables system 10 to function as described herein. Furthermore, an optimal number of reaction engines 68 and support arms 98 may be achieved by calculating the increase in power and efficiency correlated to additional reaction engines and support arms, as well as considering diminishing returns provided by the provision of additional reaction engines and support arms.

FIG. 10 discloses a detailed view of the inlet manifold 74 which can include an inwardly directed mounting brace 120 supporting the radially-outer wall 121 of the inlet manifold, while the radially-inner wall 123 of the inlet manifold is coupled to and rotates with drive shaft 18. Windows between the brace 120 are fitted with filter or screen means 124 which block entry of foreign objects, other debris, birds, etc. which are carried by an air stream into the air intake apertures. FIG. 11 discloses a detailed view of the inlet disc 76, which is rotationally supported within second end plate 58 or second half-shell 204 by the provision of roller bearings 126.

Figure 12:
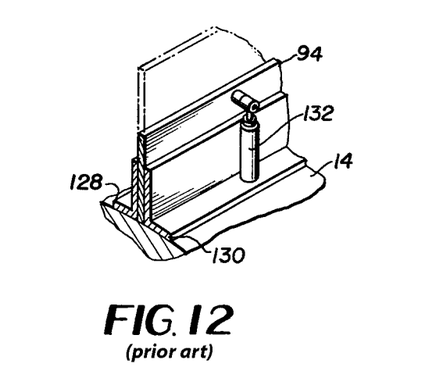
FIG. 12, note sheet 5, is an axonometric, partial, view of a system for selectivity removing the heat exchange fins from heat transfer contact with the outer periphery of the reaction engine housing.

As previously noted, the exterior peripheral surface of the housing 14 is fitted with a plurality of radially projecting, longitudinally extending vanes 94. These vanes may be selectively removed from heat exchange contact with the housing as illustrated in FIG. 12. More specifically, in one embodiment, each vane is supported by left 128 and right 130 mounting brackets which are mounted upon the housing and slidably receive opposite sides of a vane 94. Piston and cylinder assemblies 132 extend between the vane and mounting bracket such that the vane may be selectively lifted above heat exchange contact with the housing 14.

An exemplary embodiment further includes apparatus 36 to monitor armature or drive shaft speed such that fuel flow may be regulated to the engines to maintain a generally constant armature speed notwithstanding varying electrical loads. The monitor apparatus 36 is communicatively coupled to a controller 38. Upon detection of variation in load or armature rotational speed, monitor apparatus 36 can communicate to controller 38 to increase or decrease the fuel flow rate to reaction engines 68 as needed to maintain a desired constant armature speed. The subject monitoring/control systems can be provided by way of any known armature rotation monitoring and control systems, including sensing apparatuses and computer logic adapted to monitor armature rotation speed and regulate fuel flow so as to maintain a desired armature speed. Such monitoring and control systems may further be any technology known in the art that enables reaction engine drive system 10 to function as described herein.

The system schematic disclosed in FIG. 1 depicts a single reaction engine drive and generator combination. Those skilled in the art, however, will appreciate that a commercial facility will include a plurality of such units which will admit to increased power capability at a single location. Furthermore, the reaction engine driven systems disclosed herein can provide for incremental additions in response to growing power demand. Such incremental additions may be in the form of supplemental reaction engine driven systems that supplement the main reaction engine driven systems by a percentage of the power output of the main system. Those skilled in the art also will appreciate the inclusion of a control system into this type of power generating system and the importance of a constant predetermined rotor speed for the generation of current in a predetermined number of cycles per second. Variable amounts of power must be supplied to the engine in a proportionate amount in order to accommodate the various daily content power load variations. Power load variations create relative resistant variations to rotation of the rotor, the reasons for which can be found in the theories and consequent laws espoused by and experiments performed by Faraday, Lenz, Henry and others that deal with electricity, magnetism, induction and inductive reactance. For those not skilled in the art it becomes readily apparent that it is a violation of the principle of conservation of energy when it is thought that electric energy can be generated from a system without a proportional amount of energy (fuel) put into the system. As load variations occur proportionate fuel inputs must be made into the system.

In still further exemplary embodiments, a moment arm may be utilized in a system to efficiently convert and transfer energy from one or more engines to an electrical generator. The length of the moment arm may be determined by size, for example electrical generating capacity of the generator and the actual size or mass of a reaction force rotation unit, as well as thrust provided by the one or more engines, which may be working in concert. The system can offer the flexibility to change fuels, such as jet fuel, alcohol or liquid nitrogen, without having to rebuild an existing utility plant. For example, existing engines could be exchanged for now engines that utilize the new types of fuel and adjustable moment arms could be utilized. The system could further capture not only the thrust work of a reaction engine but also any heat that could be traditionally expelled from an exhaust of the engine. This heat could be used for any of a variety of purposes, for example similar to an air-fed engine utilized on an aircraft.

With respect to a moment arm, any desired material, such as, but not limited to steel or a strong, lightweight material, may be utilized. Lightweight materials may be desired in some exemplary embodiments as they would decrease the amount of mass associated with a moment arm.

In still further exemplary embodiments, when additional power is desired out of the system, the rotor inside the generator may become more difficult to rotate or may require more energy to maintain a constant speed of the standard 60 cycles per second current flow. Thus, a feature similar to auto-pilot in an aircraft may be utilized to maintain desired power and/or speed of the generator. Further, general maintenance on the system could be performed efficiently without significant amounts of down time or time when the system is not operational. For example, some exemplary embodiments may utilize swappable engines whereby an entire engine (or other desired component) could simply be replaced with a comparable engine (or component), resulting in minimal down time. Also, such a system could be environmentally friendly, for example by using catalytic converters known in the art. Other aspects of the system could include the utilization of hybrid or synthetic fuels in conjunction or in lieu of the fuels previously described, as well as the use of refurbished or remanufactured engines.

In still further exemplary embodiments, the thrust architecture and related systems and components may not need to utilize water to maintain the nuclear reactor within a desired temperature range, as would be required in a drought condition. Further, the system may not utilize water to convert to steam in order to rotate a generator, as is commonly known in the art. Additionally, while some exemplary embodiments utilize four engines, the shape of the thrust architecture and related systems can be expanded to other shapes, including hexagonal, octagonal, and n-gonal shape, or combinations and mixtures of different shapes. In such examples, the exhaust could be directed vertically through the roof of a unit in these configurations. Similarly, incremental size adjustments may be made as extra power growth may be desired. Such adjustments may be made without the construction cost of a full size plant; instead additions may be made to complement or supplement an already functional plant.

The foregoing description and accompanying figures illustrate the principles, exemplary embodiments and modes of operation of the invention. However, the invention should not be construed as being limited to the particular embodiments discussed above. Additional variations of the embodiments discussed above will be appreciated by those skilled in the art. Furthermore, it should be recognized that items and parts such as shock absorbers, dampers, gas springs, vibration isolators, machine mounts, bearings, bushings, gear boxes, and so forth can be contemplated and provided as necessary to require the embodiments of the system to function as described herein.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A reaction engine driven electrical generating system comprising:
    an electrical generator means for generating an electrical current in response to rotation of an armature within said electrical generator means;
    housing means positioned adjacent said electrical generator means;
    drive means mounted within said housing means and connected to said armature for rotating said armature, said drive means including,
        a drive shaft operably connected at one end to said armature and extending through a bearing and into said housing means,
        a reaction force rotation unit connected to said drive shaft within said housing means,
        mounting arms radially extending outwardly from said reaction force rotation unit,
        reaction engine means connected to the other extremities of said mounting arms, within said housing means,
    inlet manifold means disposed external to the housing means, axially mounted upon the drive shaft, and rotating with the drive shaft;
    disc inlet means connected to said drive shaft and radially extending outwardly therefrom into operative engagement with an inner periphery of an inlet port fashioned laterally within said housing means, said disc inlet means having a plurality of inlet apertures radially offset with respect to said drive shaft, said inlet apertures being in communication with the inlet manifold means;
    conduit means extending between each of said disc inlet apertures and an intake of a respective reaction engine means;
    exhaust means connected to said housing means for collecting and directing exhaust away from said reaction engine means, said exhaust means including
    peripherally closed exhaust deflector means mounted within said housing means coaxially about said drive shaft and radially adjacent to but spaced from said reaction engine means;
    monitor means operably connected to said drive shaft for determining a speed of rotation thereof and thus a level of thrust needed to drive said armature at a generally constant speed with varying loads drawn on the electrical generating system;
    fuel control means connected to said monitor means for regulating an amount of fuel input to said reaction engine means to maintain the level of thrust needed to drive said armature at a generally constant speed with varying electrical loads
    a first half-shell disposed on a first side of the reaction force rotation unit and coaxially receiving the drive shaft therethrough;
    a second half-shell disposed on a second side of the reaction force rotation unit, and coaxially receiving said disc inlet means through an aperture therein;
    a peripheral ring rotatably supported between the first half-shell and the second half-shell, said peripheral ring being disposed coaxially with the reaction force rotation unit and rotating therewith, said peripheral ring having a plurality of bores defined therethrough; and
    exhaust conduit means extending between each of said bores and an exhaust of the respective reaction engines means;
    wherein the first half-shell and the second half-shell enclose a volume containing the reaction force rotation unit.

2. A reaction engine electrical generating system as defined in claim 1, further comprising:
    inlet duct means extending between and in communication with the inlet manifold means and each of said disc inlet apertures.

3. A reaction engine electrical generating system as defined in claim 1, further comprising:
    roller bearing means extending between an outer periphery of said disc inlet means and the inner periphery of said housing inlet port.

4. A reaction engine electrical generating system as defined in claim 1, further comprising:

screen means extending between a radially-inner wall of said inlet manifold means and a radially-outer wall of said inlet manifold means, said radially-inner wall encircling said drive shaft, for preventing foreign objects from being drawn into said inlet manifold means and the intake of said reaction engine means.

5. A reaction engine electrical generating system as defined in claim 1 wherein:
said mounting arms are adjustable.

6. A reaction engine electrical generating system as defined in claim 1 wherein:
the peripheral ring is rotatably supported between the first half-shell and the second half-shell by a low friction track guide.

7. A reaction engine electrical generating system as defined in claim 1 wherein:
the reaction force rotation unit rotates within a vacuum.

8. A reaction engine electrical generating system as defined in claim 1 and further comprising:
a vacuum line in communication with the volume enclosed by the first half-shell and second-half shell for generating a vacuum therein.

9. A reaction engine electrical generating system as defined in claim 1 and further comprising:
roller bearing means extending between an outer periphery of said disc inlet means and the inner periphery of said aperture of said second half-shell.

10. A reaction engine electrical generating system as defined in claim 1 and further comprising:
pump means for withdrawing exhaust gas from said exhaust means.

11. A reaction engine electrical generating system as defined in claim 1 and further comprising:
means for selectively by-passing exhaust gas around said pump means.

12. A reaction engine electrical generating system as defined in claim 1 wherein:
said inlet apertures of said disc inlet means open generally longitudinally at regular peripheral locations about said drive shaft and said reaction engine means are connected upon said mounting arms for rotation in a plane transverse to said drive shaft such that each conduit means extending between a respective inlet aperture and an air intake of a reaction engine means is turned from a longitudinal to transverse orientation and guide vane means extend within each of said conduit means to facilitate uniform air flow into the inlet of said reaction engine means.

13. A reaction engine electrical generating system as defined in claim 12 wherein:
said guide vane means are adjustable so as to compensate for drops in air pressure resulting from a curvature of said conduit means.

14. A reaction engine electrical generating system as defined in claim 13 and further comprising:
computer logic for adjusting said guide vane means; and
a plurality sensor means for detecting air pressure fluctuations within said conduit means.

15. A reaction engine electrical generating system as defined in claim 1 and further comprising:
water jacket means surrounding said exhaust means within said housing means for absorbing at least a portion of the exhaust heat liberated by said reaction engine means;
means for circulating a cooling fluid within said water jacket means; and
inlet and outlet means connected to said water jacket means for withdrawing said cooling fluid from said water jacket means for subsequent use as desired.

16. A reaction engine electrical generating system as defined in claim 15 and further comprising:
auxiliary heating means connected to said means for circulating cooling fluid for selectively applying heat to said cooling fluid so as to vaporize said cooling fluid.

17. A reaction engine electrical generating system as defined in claim 15 and further comprising:
heat exchange fin means mounted exteriorly about said housing means and around said water jacket means.

18. A reaction engine electrical generating system as defined in claim 17 and further comprising:
means connected to said fin means for selectively removing said fin means from heat exchange contact with said housing means.

19. A reaction engine driven electrical generating system comprising:
an electrical generator for generating an electrical current in response to rotation of an armature within the generator;
a housing positioned adjacent said electrical generator;
a drive mechanism mounted within said housing and connected to said armature for rotating said armature, said drive mechanism comprising:
a drive shaft operably connected at one end to said armature and extending through a bearing and into said housing,
a reaction force rotation unit connected to said drive shaft within said housing,
mounting arms radially extending outwardly from said reaction force rotation unit,
a reaction engine connected to the other extremities of said mounting arms, within said housing,
a peripheral ring disposed coaxially with the reaction force rotation unit and rotating therewith, said peripheral ring having a plurality of bores defined therethrough,
an exhaust conduit extending between each of said bores and an exhaust of a respective reaction engine,
a first half-shell disposed on a first side of the reaction force rotation unit and coaxially receiving the drive shaft therethrough;
a second half-shell disposed on a second side of the reaction force rotation unit, and coaxially receiving a disc inlet through an aperture therein, the first half-shell and the second half-shell enclosing a volume containing the reaction force rotation unit;
an inlet manifold disposed external to the housing, axially mounted upon the drive shaft, and rotating with the drive shaft;
the disc inlet connected to said drive shaft and radially extending outwardly therefrom into operative engagement with an inner periphery of an inlet port fashioned laterally within said housing, said disc inlet having a plurality of inlet apertures radially offset with respect to said drive shaft, said inlet apertures being in communication with the inlet manifold;
a conduit extending between each of said disc inlet apertures and an intake of the respective reaction engine;
an exhaust connected to said housing for collecting and directing exhaust away from said reaction engine, said exhaust comprising:

a peripherally closed exhaust deflector mounted within said housing coaxially about said drive shaft and radially adjacent to but spaced from said reaction engine;

a monitor operably connected to said drive shaft for determining a speed of rotation thereof and thus a level of thrust needed to drive said armature at a generally constant speed with varying loads drawn on the electrical generating system; and a fuel controller connected to said monitor for regulating an amount of fuel input to said reaction engine to maintain the level of thrust needed to drive said armature at a generally constant speed with varying electrical loads.

* * * * *